United States Patent
Wellbrock et al.

(10) Patent No.: US 9,136,970 B2
(45) Date of Patent: Sep. 15, 2015

(54) NETWORK PROTECTION AGAINST ROGUE TRANSMITTER

(71) Applicant: Verizon Patent and Licensing Inc., Basking Ridge, NJ (US)

(72) Inventors: Glenn A. Wellbrock, Wylie, TX (US); Tiejun J. Xia, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 14/088,908

(22) Filed: Nov. 25, 2013

(65) Prior Publication Data

US 2015/0147058 A1    May 28, 2015

(51) Int. Cl.
*H04J 14/02* (2006.01)
*H04Q 11/00* (2006.01)
*H04B 10/50* (2013.01)
*H04B 10/564* (2013.01)

(52) U.S. Cl.
CPC .......... *H04J 14/0212* (2013.01); *H04B 10/564* (2013.01); *H04Q 11/0005* (2013.01)

(58) Field of Classification Search
CPC ............ H04J 14/021–14/0213; H04J 14/0221; H04J 14/0224; H04J 14/0258; H04Q 2011/0009; H04Q 2011/0016–2011/0018; H04Q 2011/0069; H04B 10/075–10/0779
See application file for complete search history.

(56) References Cited

U.S. PATENT DOCUMENTS

| | | | | |
|---|---|---|---|---|
| 2004/0067007 | A1* | 4/2004 | Arbeus et al. | 385/15 |
| 2010/0202777 | A1* | 8/2010 | Liu et al. | 398/83 |
| 2011/0076020 | A1* | 3/2011 | Nilsson | 398/65 |
| 2013/0058650 | A1* | 3/2013 | Bouda | 398/48 |
| 2013/0094851 | A1* | 4/2013 | Xu et al. | 398/25 |
| 2013/0251365 | A1* | 9/2013 | Sone et al. | 398/38 |
| 2013/0322877 | A1* | 12/2013 | Geyer et al. | 398/38 |
| 2014/0097756 | A1* | 4/2014 | Zhong et al. | 315/151 |

FOREIGN PATENT DOCUMENTS

WO    WO-2012/171202 A1 *    12/2012

* cited by examiner

*Primary Examiner* — David Payne
*Assistant Examiner* — Casey Kretzer (57) ABSTRACT

A desired characteristic associated with a signal generated by a programmable transmitter is determined. The signal may be combined with other signals to form a combined signal, and sub-optical monitoring may be performed on the combined signal to determine an optical characteristic associated with the signal. The optical characteristic may be evaluated to determine if the programmable transmitter is operating improperly. For example, if the optical characteristic does not conform to a desired range of values, it is determined whether the optical characteristic is intentionally set outside of the desired range. A tuning instruction to reconfigure the programmable transmitter may be generated if the programmable transmitter is operating improperly.

20 Claims, 11 Drawing Sheets

NETWORK PROTECTION AGAINST ROGUE TRANSMITTER

BACKGROUND

Various communication networks employ optical links. For example, IEEE 802.3ae-2002™ standard, Aug. 30, 2002, and IEEE Draft P802.3aq™/D4.0, May, 2006, define physical layer specifications for communicating over optical fibers. Section 52-5 of the IEEE 802.3ae-2002 standard specifies requirements for both Short Range (SR) and Long Range (LR) fiber links. Section 68.5 of the IEEE P802.3aq™/D4.0 draft defines a Long Range Multimode (LRM) fiber link. Programmable optical transmitters are increasingly being used in the optical links to improve performance and flexibility. For example, programmable optical transmitters may be used in connection with colorless, directionless, contentionless reconfigurable optical add/drop multiplexers (CDC ROADMs) in wavelength division multiplexing optical transport networks (OTNs).

DETAILED DESCRIPTION OF PREFERRED EMBODIMENTS

The following detailed description refers to the accompanying drawings. The same reference numbers in different drawings may identify the same or similar elements.

In one implementation described herein, a signal generated by a programmable transmitter may be associated with a desired characteristic. The optical signal may be monitored to determine an actual optical characteristic associated with the signal, and the actual optical characteristic and the desired characteristic are compared. If needed, an instruction to the transmitter is generated based on comparing the optical characteristic and the desired characteristic, and the instruction causes the transmitter to modify the signal. For example, the instruction may reprogram or tune the transmitter (i.e., cause the transmitter to modify the signal) when the optical characteristic and the desired characteristic differ by at least a threshold amount. The signal may be monitored before the signal is combined with other signals generated by other transmitters by a wavelength selective switch (WSS). For example, the signal may be directly received from the transmitter or the signal may be extracted from a multiplexed output of a power coupler that combines signals from multiple transmitters.

The desired characteristic may relate, for example, to a desired wavelength associated with the signal, a difference between the wavelength associated with the signal and another wavelength associated with the another signal, a desired power level associated with the signal, or a desired wavelength variance associated with the signal. The instruction may cause the transmitter to shut down if, for example, prior attempts have been made to reprogram the transmitter, and the transmitter continues to generate an undesirable signal.

Figure 1A:
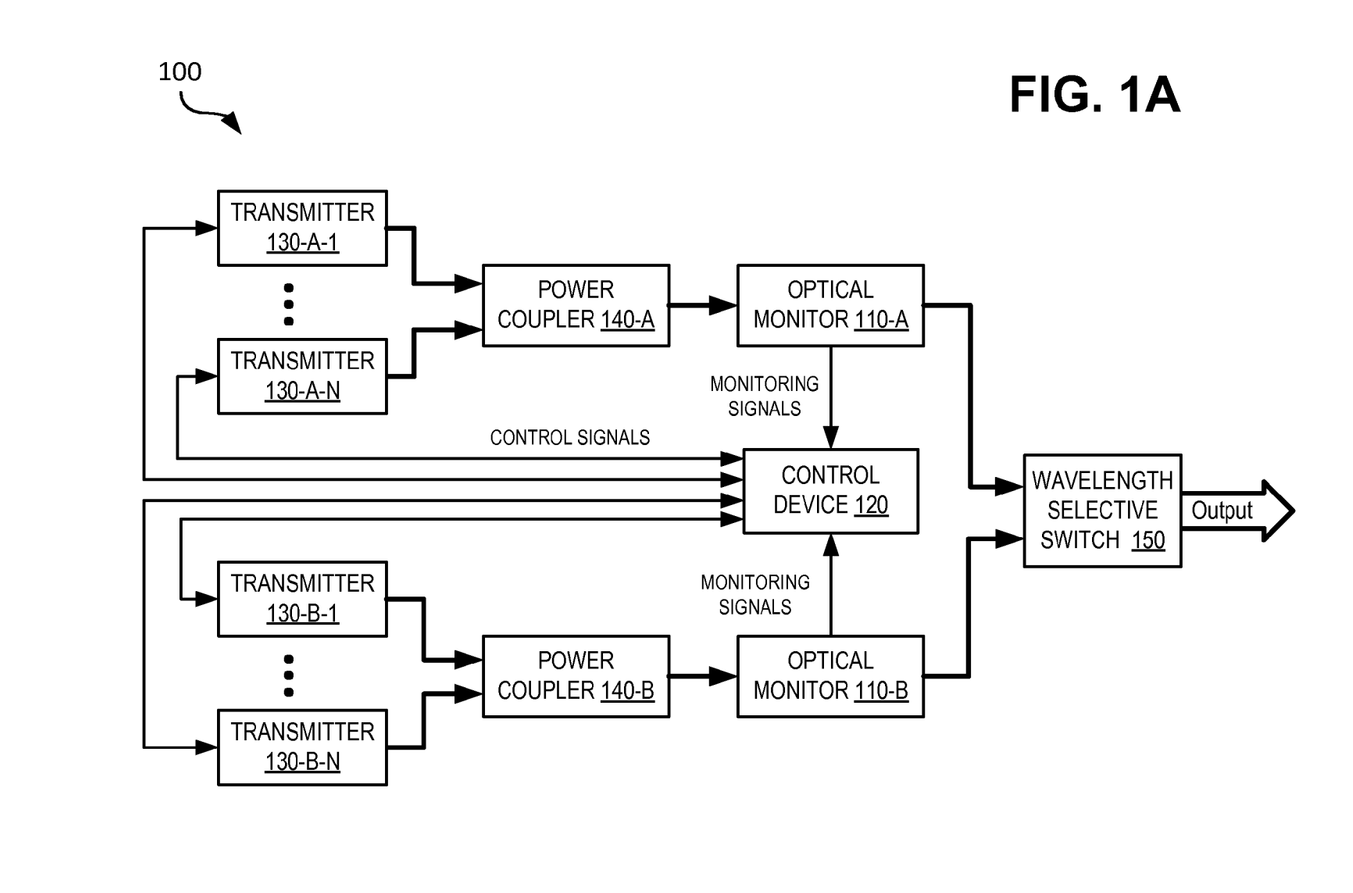
FIGS. 1A and 1B are block diagrams of an exemplary environment in which systems and methods described herein may be implemented.
Figure 1B:
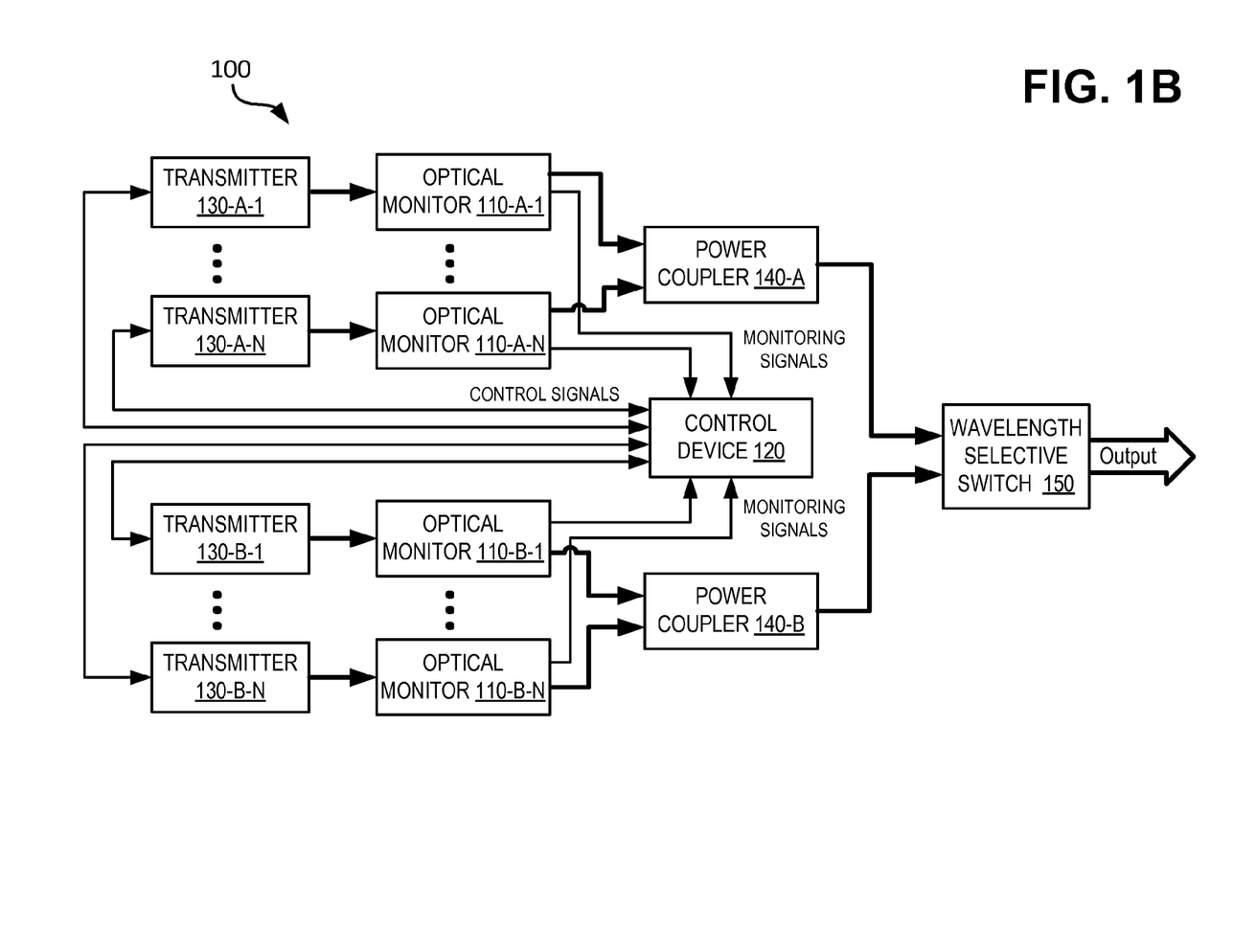

FIGS. 1A and 1B are block diagrams of an exemplary environment 100 in which systems and methods described herein may be implemented. As shown in FIG. 1A, environment 100 may include optical monitors 110, referred to collectively as optical monitors 110 and individually as optical monitor 110 (shown as optical monitors 110-A and 110-B in FIG. 1A and as optical monitors 110-A-1 through 110-A-N and 110-B-1 through 110-B-N in FIG. 1B). Optical monitors 110 may examine optical signals and provide monitoring signals regarding aspects of the optical signals to a control device 120.

Optical monitor 110 may be a sub-optical monitoring unit positioned to extract a portion of an output of an add unit of a reconfigurable optical add/drop multiplexers (ROADM), such as power coupler 140. Optical monitor 110 may include, for example, some type of waveguide and/or other optical component to acquire an optical signal generated by a transmitter 130, referred to collectively as transmitters 130 and individually as transmitter 130 (shown as transmitters 130-A-1 through 130-A-N and 130-B-1 through 130-B-N in FIGS. 1A and 1B). Optical monitor 110 may further include, for example, a photodetector and/or other components to measure a property associated with the optical signal, such as a wavelength and/or a power level.

Control device 120 may evaluate the properties of an optical signal to determine a status of a corresponding transmitter 130. For example, control device 120 may compare the measured actual properties of the optical signals to desired properties of the optical signals. Control device 120 may further provide control signals to transmitters 130 based on the comparison. For example, control device 120 may instruct a particular transmitter 130 to output a modified optical signal or to shut down (i.e., cease transmitting).

In one implementation, control device 120 may be included as a component of and/or connected to optical monitor 110, transmitter 130, power coupler 140, or a wavelength selective switch (WSS) 150.

Transmitters 130 may include, for example, an optical light source, such as a laser. Transmitters 130 may be programmed, for example, by control device 120, to modify the operation of the optical light source. For example, control device 120 may instruct a transmitter 130 to output a different optical signal (e.g., a signal of different wavelength, power, and/or other optical characteristic).

As shown in FIGS. 1A and 1B, signals from transmitters 130 may be combined by an add unit of a ROADM, such as power couplers 140 (referred to collectively as power coupler 140 and individually as power coupler 140), and the output from power couplers 140 may be combined by WSS 150. Specifically, FIGS. 1A and 1B show that power coupler 140-A may combine signals from transmitters 130-A-1 through 130-A-N, and power coupler 140-B may combine signals from transmitters 130-B-1 through 130-B-N. It should be appreciated that other types of optical components may be used to combine/multiplex the signals outputted by transmitters 130.

An optical monitor 110 may concurrently evaluate multiple signals. For example, in an implementation shown in FIG. 1A, optical monitor 110-A may evaluate the combined optical signals from power coupler 140-A (i.e., signals outputted by transmitters 130-A-1 through 130-A-N), and optical monitor 110-B may evaluate the combined optical signals from power coupler 140-B (i.e., signals outputted by transmitters 130-B-1 through 130-B-N). In another implementation, an optical monitor 110 may be positioned at another network location, such as to receive and evaluate the output from WSS 150 or from another device (not shown) that receives and combines outputs from power couplers 140.

In another implementation shown in FIG. 1B, an optical monitor 110 may evaluate a single signal (e.g., an optical monitor 110 may receive and evaluate an optical signal from a corresponding transmitter 130). In the example of FIG. 1B, environment 100 may include optical monitors 110-A-1 through 110-A-N that are positioned to receive and monitor the signals outputted by transmitters 130-A-1 through 130-A-N, and optical monitors 110-B-1 through 110-B-N that are positioned to receive and monitor the signals outputted by transmitters 130-B-1 through 130-B-N.

In another implementation (not depicted), multiple optical monitors 110 may be positioned to evaluate an output of power coupler 140 or WSS 150. For example, multiple optical monitors 110 may be positioned between power coupler 140 and WSS 150, and each of the optical monitors 110 may evaluate a subset (i.e., less than all) of signals included in an output of the power coupler 140 or WSS 150.

The configurations illustrated in FIGS. 1A and 1B are provided for simplicity. It should be understood that environment 100 may include more or fewer components. For example, environment 100 may include optical components such as waveguides, filters, amplifiers, etc. Furthermore, it should be appreciated that functions described as being implemented by a single component in environment 100 may be performed by multiple components, and functions described as being implemented by multiple component in environment 100 may be performed by a single component.

Figure 2:
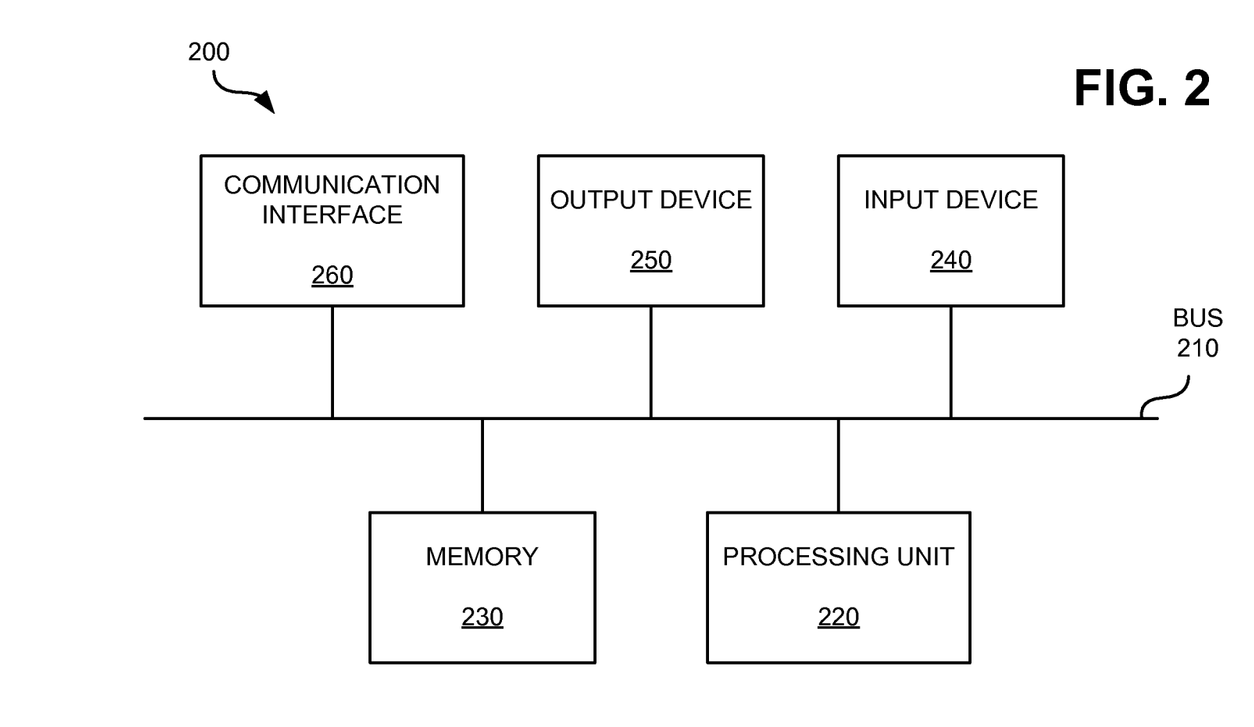
FIG. 2 illustrates a block diagram of exemplary components in a control device included in the environment of FIG. 1.

FIG. 2 is a diagram of exemplary components of a device 200 in one implementation that may correspond, for example, to control device 120 or correspond to or be included in other components of environment 100. One or more of components included in device 200 may be implemented and/or installed as software, hardware, or a combination of hardware and software. As shown in FIG. 2, device 200 may include, for example, a bus 210, a processing unit 220, a memory 230, an input device 240, an output device 250, and a communication interface 260.

Bus 210 may permit communication among the components of device 200. Processing unit 220 may include one or more processors or microprocessors that interpret and execute instructions. In other implementations, processing unit 220 may be implemented as, or include, one or more application specific integrated circuits (ASICs), field programmable gate arrays (FPGAs), and/or the like.

Memory 230 may include a random access memory (RAM) or another type of dynamic storage device that stores information and instructions for execution by processing unit 220, a read only memory (ROM), electrical erasable permanent memory (Flash) or another type of static storage device that stores static information and instructions for the processing unit 220, and/or some other type of magnetic or optical recording medium and its corresponding drive for storing information and/or instructions.

Input device 240 may include a device that permits an operator to input information to device 200, such as a keyboard, a keypad, a mouse, a pen, a microphone, one or more biometric mechanisms, and the like. Output device 250 may include a device that outputs information to the operator, such as a display, a speaker, etc.

Communication interface 260 may include a transceiver that enables device 200 to communicate with other devices and/or systems. For example, communication interface 260 may include mechanisms for communicating with other devices, such as other devices of environment 100.

As described herein, device 200 may perform certain operations in response to processing unit 220 executing software instructions contained in a computer-readable medium, such as memory 230. A computer-readable medium may include a tangible, non-transitory memory device. A memory device may include space within a single physical memory device or spread across multiple physical memory devices. The software instructions may be read into memory 230 from another computer-readable medium or from another device via communication interface 260. The software instructions contained in memory 230 may cause processing unit 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may include fewer components, different components, differently arranged components, or additional components than those depicted in FIG. 2. Furthermore, it should be appreciated that tasks described as being performed by two or more other components of device 200 may be performed by a single component, and tasks described as being performed by a single component of device 200 may be performed by two or more components.

FIGS. 3A-3F provide graphs 300 that depict exemplary powers and wavelengths for two signals evaluated, for example, by optical monitor 110. For example, graph 300 shows that a first signal may be associated with a first desired wavelength $\lambda_1$, a second signal may be associated with a second desired wavelength $\lambda_2$. As further shown in graph 300, the first and second signals may be associated with a desired power level $P_1$.

Figure 3A:
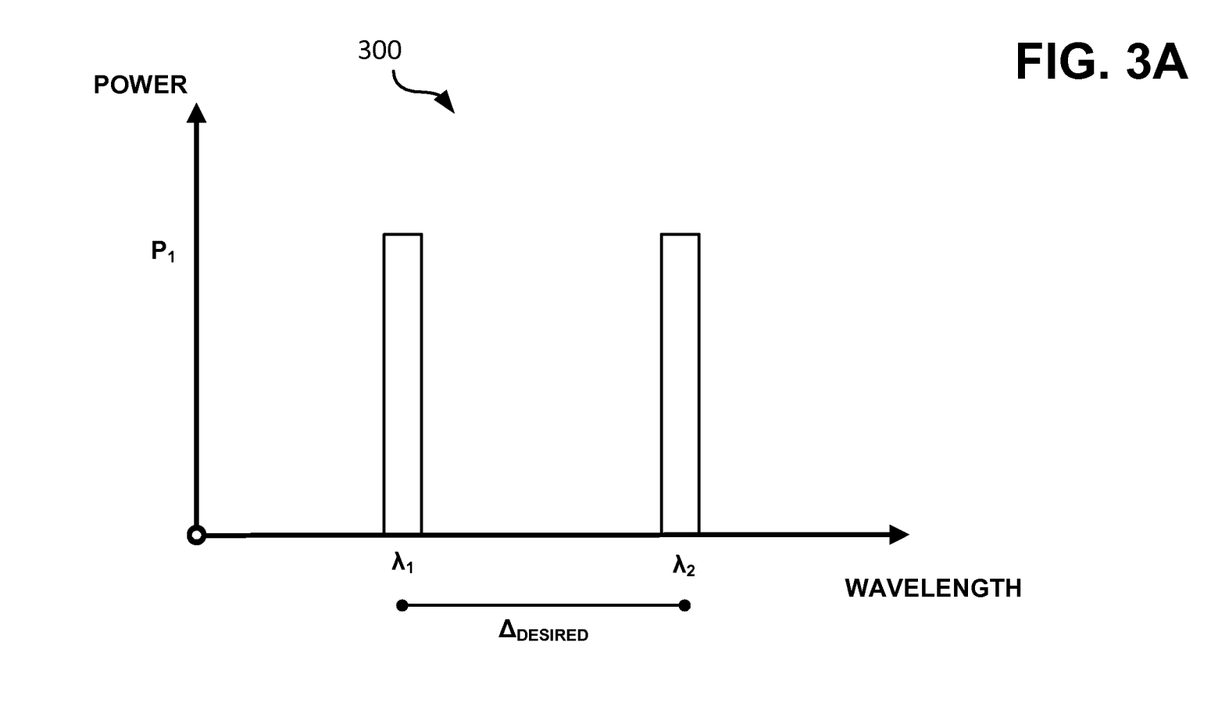
FIGS. 3A-3F provide graphs that depict exemplary powers and wavelengths for two signals evaluated, for example, by an optical monitor included in the environment of FIG. 1.

As shown in FIG. 3A, wavelengths $\lambda_1$ and $\lambda_2$ may be separated by a desired wavelength difference, $\Delta_{DESIRED}$. The desired wavelength difference $\Delta_{DESIRED}$ may be a fixed amount or may be selected for optimal transmission of the first and second signals from WSS 150. For example, the desired wavelength difference $\Delta_{DESIRED}$ may be selected so that the first and the second signals may be efficiently combined and transmitted by power coupler 140 and WSS 150. In addition, the desired wavelength difference ($\Delta_{DESIRED}$) may be selected so that the first and second signals do not interfere with each other. For example, the desired wavelength difference $\Delta_{DESIRED}$ may be dynamically determined based on, for example, the desired wavelengths $\lambda_1$ and/or $\lambda_2$, the number N of transmitters 130 being combined by power coupler 140, performance aspects associated with transmitters 130 (e.g., maximum and/or minimum output wavelengths), the desired power level $P_1$, etc.

As further shown in graph 300 in FIG. 3A, the first and second signals may be associated with a power level $P_1$. The power level $P_1$ may be selected for optimal transmission of the first and second signals from WSS 150. For example, the power level $P_1$ may be selected so that the first and the second signals may be efficiently combined and transmitted by power coupler 140 and WSS 150. In addition, the power level $P_1$ may be selected so that the first and second signals do not interfere with each other.

The desired signal properties depicted in FIG. 3A may not be achieved if, for example, a particular transmitter 130 receives faulty instructions and/or begins to operate in an undesired manner (i.e., the particular transmitter 130 begins to operate as a rogue transmitter).

Figure 3B:
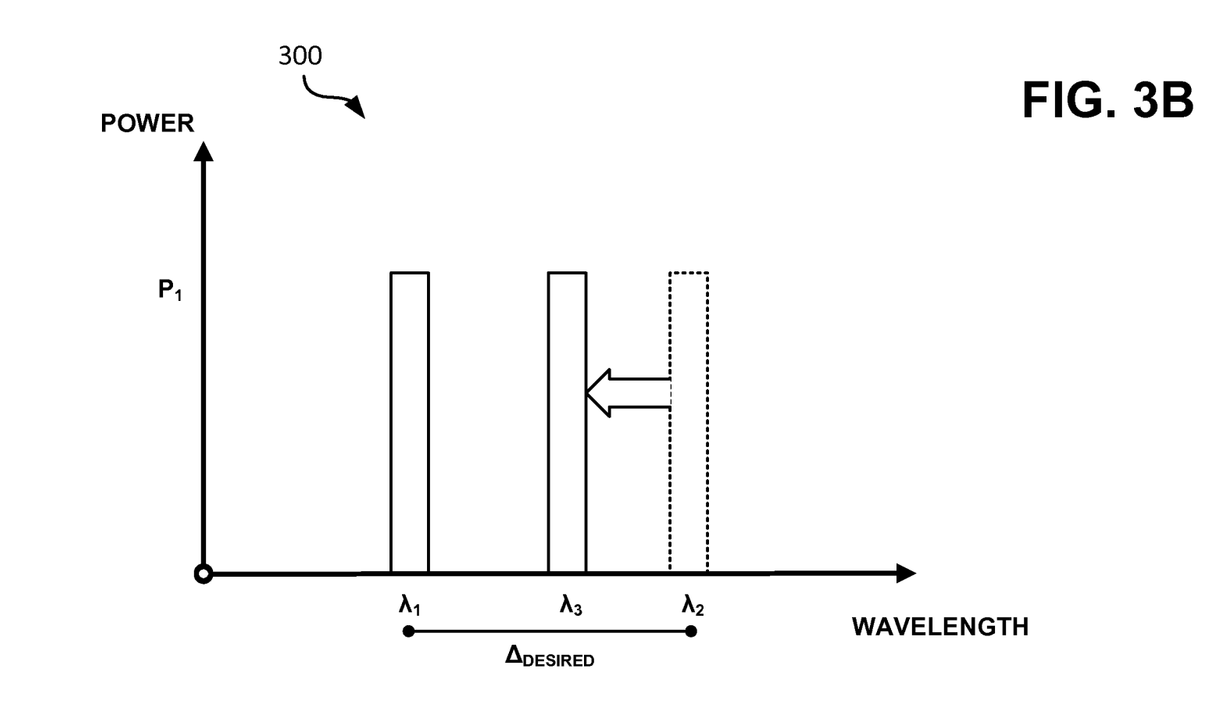

In an example depicted in FIG. 3B, a particular transmitter 130 that is intended to output a signal with a desired wavelength $\lambda_2$ may, instead, output a signal with a lower measured wavelength $\lambda_3$. For example, a particular transmitter 130 may drift from desired wavelength $\lambda_2$ to the lower measured wavelength $\lambda_3$. Outputting the signal with the lower measured wavelength $\lambda_3$ may adversely affect the performance and/or reliability of environment 100. For example, if the measured wavelength $\lambda_3$ is too close to or overlaps with wavelength $\lambda_1$ (e.g., if wavelengths $\lambda_1$ and $\lambda_3$ are separated by less than the desired wavelength difference $\Delta_{DESIRED}$), one or both of the signals associated with the measured wavelengths $\lambda_1$ and $\lambda_3$ may be lost when combined (or multiplexed) by power coupler 140 and/or WSS 150.

Figure 3C:
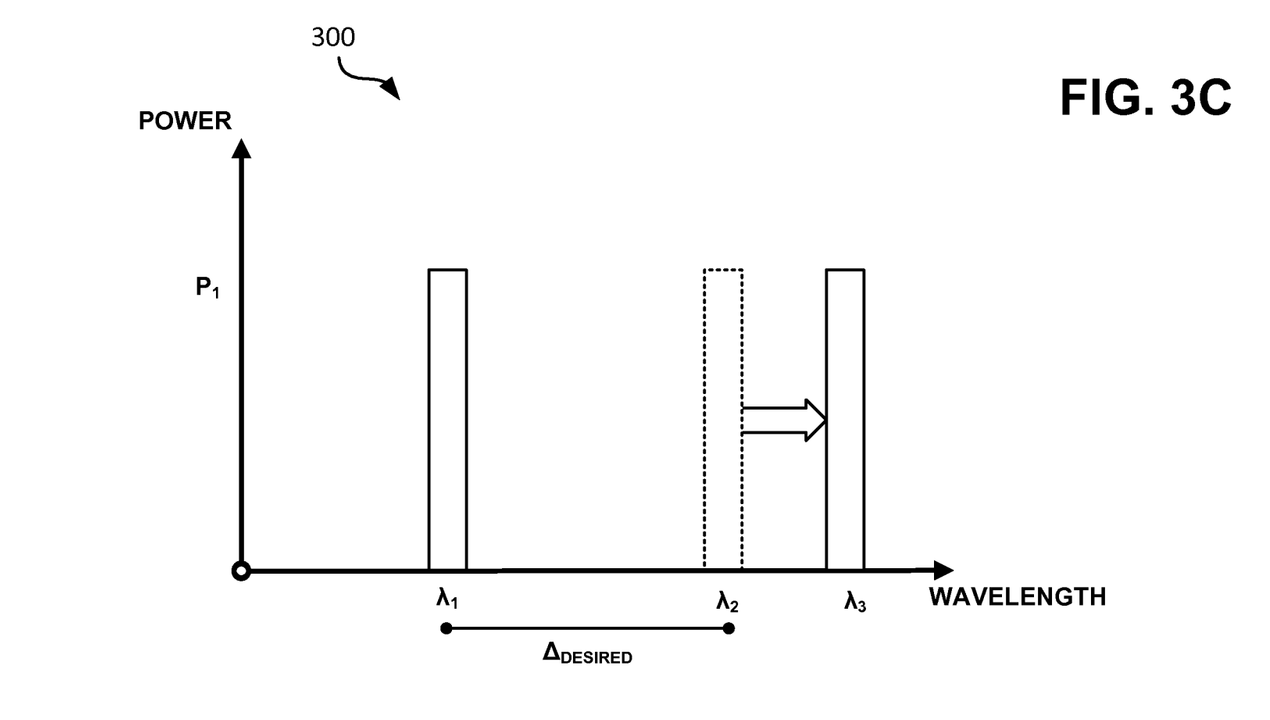

In the example depicted in FIG. 3C, problems may also arise when the measured wavelength $\lambda_3$ is more than the desired wavelength $\lambda_2$. For example, a particular transmitter 130 may drift from desired wavelength $\lambda_2$ to the higher measured wavelength $\lambda_3$. If the measured wavelength $\lambda_3$ is too close to or overlaps with a higher desired wavelength (not shown), one or both of the signals associated with wavelengths $\lambda_3$ and the higher wavelength may be lost when combined by power coupler 140 and/or WSS 150.

Moreover, processing and/or transmitting a signal associated with undesired measured wavelength $\lambda_3$ may require additional resources, reduce reliability, etc. For example, power coupler 140 and/or WSS 150 may require additional power to combine signals associated with measured wavelengths $\lambda_1$ and $\lambda_3$ if the difference between these two wavelengths is too large or too small. Furthermore, the signal associated with measured wavelength $\lambda_3$ may be incompatible with one or more components included in environment 100. For example, the measured wavelength $\lambda_3$ may be outside a range of wavelengths passed by a filter (not shown) included in environment 100 and, therefore, may be blocked by the filter.

In operation, control device 120 may determine, for example, whether the measured wavelength $\lambda_3$ differs from the desired wavelength $\lambda_2$, whether the measured wavelengths $\lambda_1$ and $\lambda_3$ differ by more or less than a threshold amount (e.g., are associated with a difference that does not correspond to the desired wavelength difference $\Delta_{DESIRED}$), or whether the measured wavelength $\lambda_3$ differs from desired wavelength $\lambda_2$ by more than a threshold amount.

Figure 3D:
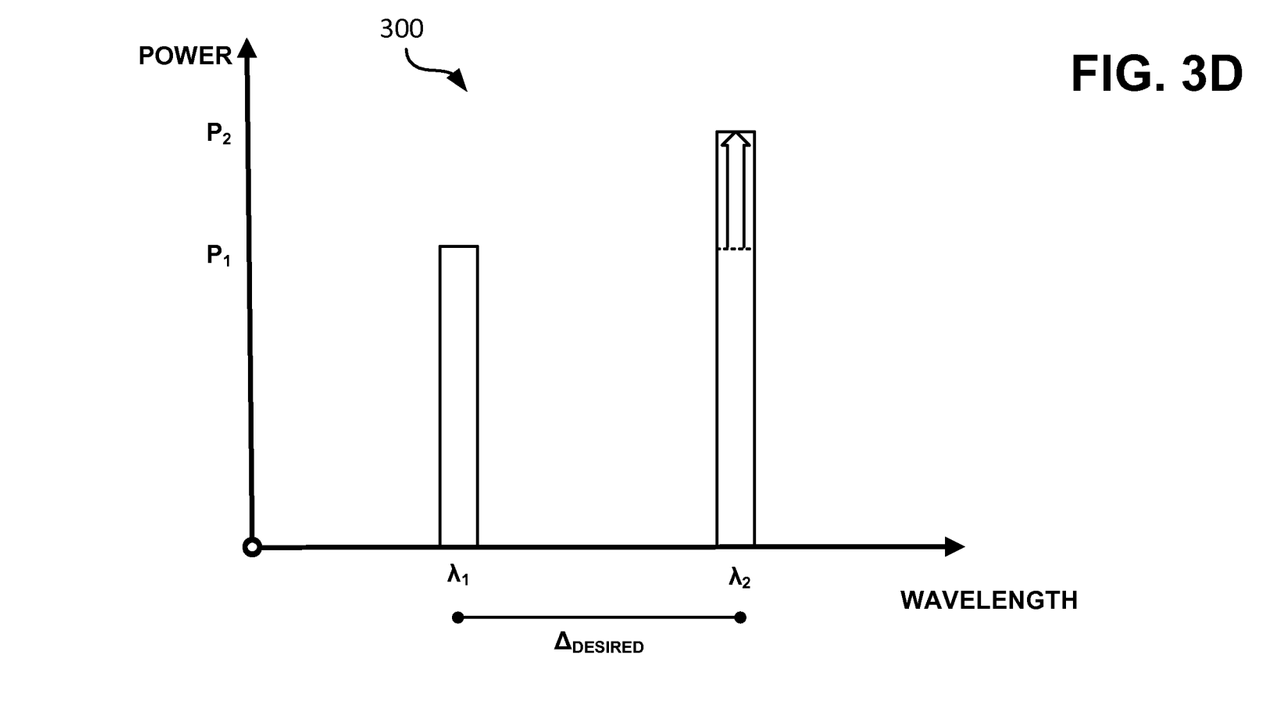

FIG. 3D depicts a situation in which the particular transmitter 130 outputs a signal (with a wavelength $\lambda_2$) at an actual power level $P_2$ that is higher than the desired power level $P_1$. For example, a particular transmitter 130 may drift from the desired power level $P_1$ to the higher actual power level $P_2$. Outputting a signal at the higher actual power level $P_2$ may adversely affect the performance and/or reliability of environment 100. For example, one or more components of environment 100 may be damaged when transmitting or processing the signal at the higher actual power level $P_2$. Furthermore, the signal at the higher actual power level $P_2$ (depicted in FIG. 3D as having a wavelength $\lambda_2$) may dominate or otherwise cause errors with respect to the other signal associated with power level $P_1$ when the two signals are combined by power coupler 140 and/or WSS 150. For example, a detector (not shown) may be unable to detect the other signal associated with the desired power level $P_1$ in a combined signal that also includes the signal associated with the higher power level $P_2$.

Figure 3E:
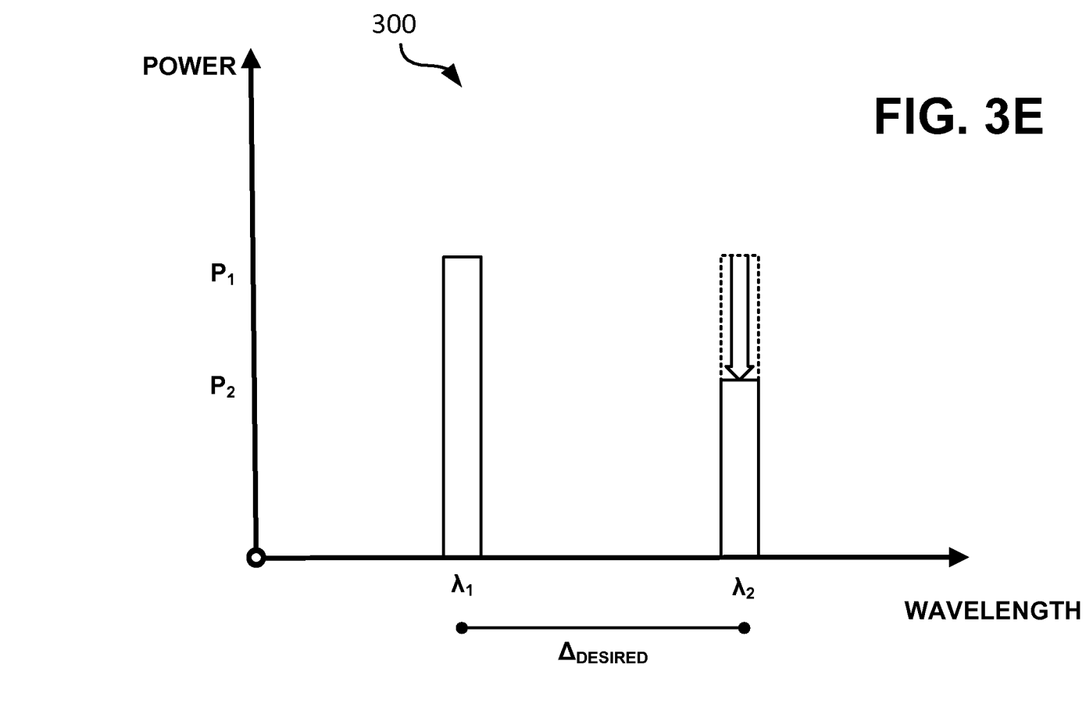

In the example depicted in FIG. 3E, the particular transmitter 130 outputs a signal (with a wavelength $\lambda_2$) at an actual power level $P_2$ that is lower than the desired power level $P_1$. For example, a particular transmitter 130 may drift from the desired power level $P_1$ to the lower actual power level $P_2$. Outputting a signal at the lower actual power level $P_2$ may adversely affect the performance and/or reliability of environment 100. For example, a detector (not shown) may be unable to detect the signal associated with the lower power level $P_3$. Furthermore, another signal associated with the higher power level $P_1$ (depicted in FIG. 3E as having a wavelength $\lambda_1$) may dominate or otherwise cause errors with respect to the signal associated with lower power level $P_2$ when the two signals are combined by power coupler 140 and/or WSS 150.

In another implementation, control device 120 may determine, for example, whether the measured power level $P_2$ differs from the desired power level $P_1$ or whether the measured power level $P_2$ differs from the desired power level $P_1$ by more than a threshold amount.

Figure 3F:
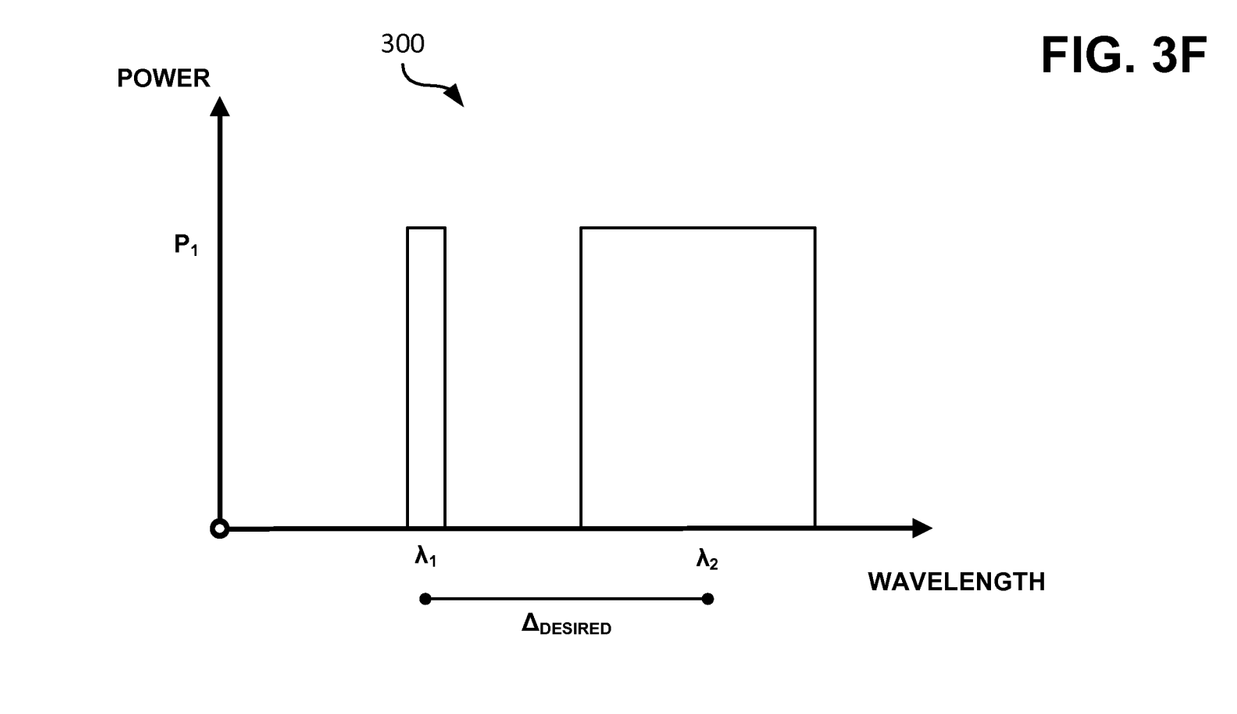

Referring to FIG. 3F, a particular transmitter 130 may output a signal with desired wavelength $\lambda_2$ and power level $P_1$, but the signal may be associated with an undesirable wavelength variance (or spread). Outputting the signal with a large wavelength variance may adversely affect the performance and/or reliability of environment 100. For example, if some of an output signal is associated with a range wavelengths that is too close to or overlaps with another measured wavelength $\lambda_1$ (e.g., such that that a range of wavelengths included in a first signal and a wavelength $\lambda_1$ of a second signal are separated by less than the desired wavelength difference $\Delta_{DESIRED}$), one or both of the signals may be lost when combined (or multiplexed) by power coupler 140 and/or WSS 150.

Moreover, processing and/or transmitting a signal with a large wavelength variance may require additional resources, reduce reliability, etc. For example, power coupler 140 and/or WSS 150 may require additional power to handle the signal with the large wavelength variance. Furthermore, the signal with the large wavelength variance may be incompatible with one or more components included in environment 100. For example, a portion of the signal may be outside a range of wavelengths passed by a filter (not shown) included in environment 100.

In operation, control device 120 may determine, for example, whether a measured wavelength variance (or other measure of wavelength spread) associated with a signal exceeds a threshold variance. The threshold variance may be a fixed amount or may be dynamically determined based on, for example, the desired wavelength $\lambda_2$, the number N of transmitters 130 whose outputs are being combined by a power coupler 140, performance aspects associated with transmitters 130 (e.g., maximum and/or minimum output wavelengths), the desired power level $P_1$, etc.

Although various factors associated with a signal, such as power, wavelengths, and wavelength various, are discussed above with respect to FIGS. 3A-3F, it should be appreciated that optical monitors 110 may detect other aspects (e.g., phase) of the signals outputted by transmitters, and control device 120 may perform appropriate actions based on these other detected aspects.

Figure 4:
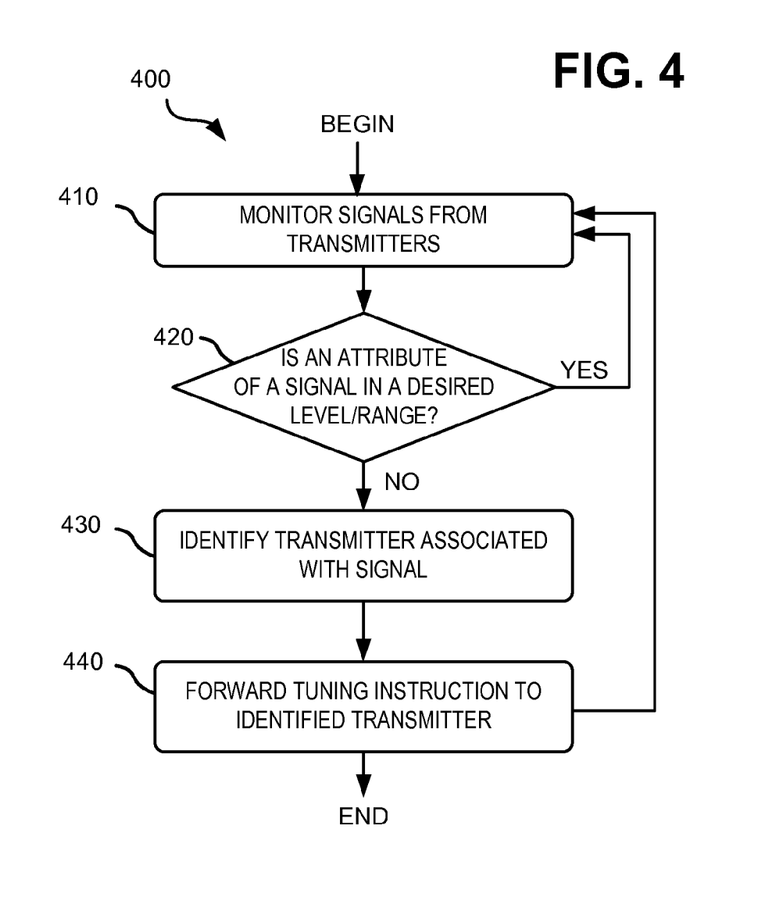
FIGS. 4 and 5 depict flow graphs of an exemplary process for identifying and handling a rogue transmitter in the environment of FIG. 1.

FIG. 4 is a flow graph of an exemplary process 400 for identifying and handling a rogue transmitter 130 according to an implementation described herein. In one implementation, process 400 may be performed by optical monitors 110 and/or control device 120. In another implementation, some or all of process 400 may be performed by optical monitors 110 and/or control device 120 in conjunction with one or more other devices. Process 400 is described with reference to components described above with respect to FIGS. 1A, 1B, and 2.

As shown in FIG. 4, process 400 may include monitoring signals from a transmitter 130 (block 410). For example, optical monitor 110 may receive a signal from a transmitter 130 and may identify an attribute associated with the signal. In another implementation, optical monitor 110 may receive an output, of a power coupler 140, that is based on multiple signals, and optical monitor 110 may demultiplex the output to separate the signals. Optical monitor 110 may monitor the signal in real time or in near real time before the signal is combined with signals from other transmitters 130 and outputted by WSS 150.

Continuing with process 400 in FIG. 4, optical monitor 110 may determine if an attribute of a signal is within a desired level or range (block 420). As described above in the examples of FIGS. 3A-3F, optical monitor 110 may measure an attribute, such as a wavelength, power level, a wavelength variance, etc., associated with the monitored signal, and control device 120 may determine whether the measured attribute(s) conforms to the desired level or ranges. Control device 120 may determine, for example, whether a measured wavelength or power level differs from an intended level. Control device 120 may also determine, for example, whether a measured wavelength variance (or other measure of wavelength spread) associated with a signal exceeds a threshold variance.

Control device 120 may dynamically determine the desired signal level and/or range. For example, control device 120 may determine the desired signal level or range based on tuning instructions provided to the corresponding transmitter 130. For example, control device 120 may previously instruct the transmitter 130 to output a signal at a particular wavelength and power level. Control device 120 may also receive a user input and determine the desired signal level and/or range based on the user input. For example, control device 120 may provide a graphical user interface (GUI) or other interface to receive the input from a user.

Alternatively or in addition, a signal may be evaluated in process block 420 with respect to another signal and without knowledge of desired signal level or range. For example, optical monitor 110 may measure two signals, and control device 120 may compare attributes associated with the signals. For example, as described with respect to FIGS. 3A-3C, control device 120 may determine whether a measured wavelength difference between two signals differs from a desired wavelength difference $\Delta_{DESIRED}$.

In another implementation, control device 120 may identify a transmitter 130, in a group of transmitters, that outputs an optical signal that is furthest from a desired level or range. In the example of FIGS. 3D and 3E, control device may identify a signal that is associated with a power level that is furthest from $P_1$.

Continuing with process 400 in FIG. 4, if the signal attributes are within of desired levels or ranges (block 420-YES), optical monitor 110 may continue to monitor the signals in process block 410 without reprogramming the transmitter 130.

As further shown in process 400 in FIG. 4, if an attribute associated with a particular signal is not within the desired level or range (block 420-NO), control device 120 may identify a transmitter 130 associated with the particular signal (block 430) and may forward an appropriate instruction to the identified transmitter (block 440). For example, control device 120 may decode the signal to identify the transmitter 130 and may instruct the identified transmitter to modify an output signal to better conform to the desired levels. The instructions may cause the particular transmitter 130 to tune its transmission to better achieve the desired levels or ranges.

Figure 5:
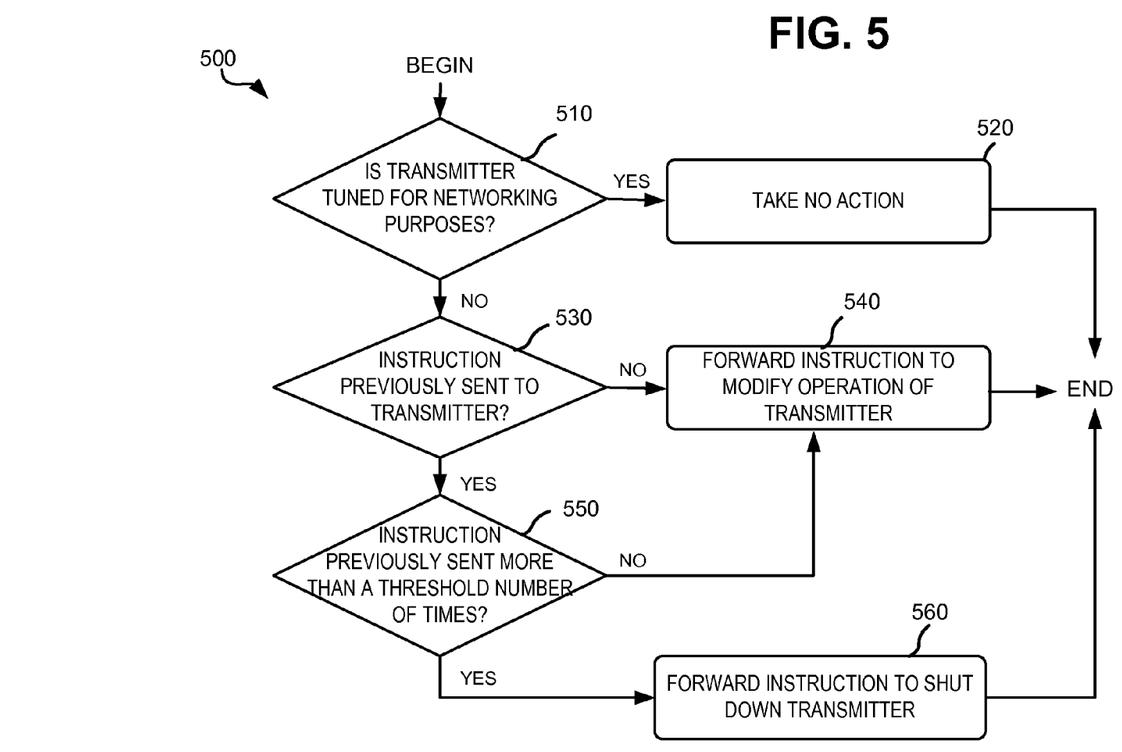

FIG. 5 is a flow graph of an exemplary process 500 for forwarding an appropriate instruction in block 440 to a transmitter 130 that is outputting a signal outside a desired level or range, according to an implementation described herein. In one implementation, process 500 may be performed by control device 120. In another implementation, some or all of process 500 may be performed by control device 120 in conjunction with one or more other devices. Process 400 is described with reference to components described above with respect to FIGS. 1A, 1B, and 2.

As shown in FIG. 5, process 500 may include determining if a particular transmitter 130 that outputs a faulty signal (i.e., a signal associated with a measured attribute outside of a desired level or range) was tuned for networking purposes (block 510). For example, control device 120 may determine whether the transmitter 130 was previously tuned to output the signal associated with a measured attribute outside of a desired level or range. For example, control device may modify the output of transmitter for compatibility with power coupler 140, WSS 150, and/or a downstream optical system. During "tuning," control device 120 may cause one or more components (e.g., a signal source, a lens, a waveguide, etc.) of transmitter 130 to be modified and/or manipulated. For example, control device 120 may activate a motor that moves an optical component included in or downstream of transmitter 130. Control device 120 may store information identifying tuned transmitters and may determine whether the identified transmitter 130 is included in the list.

If the particular transmitter 130 is tuned for networking purposes (block 510—YES), an attribute associated with the signal may be intentionally set to an apparently undesired level or range, and control device 120 may take no action (i.e., does not send tuning instructions to the particular transmitter 130) (block 520). For example, control device 120 may determine that transmitter 130 should continue to output a signal with a particular attribute outside of a typical range used for networking purposes.

In another implementation, control device 120 may forward tuning instructions to another, different transmitter 130 that is associated with a signal that is not outside undesired level or range. In the example of FIGS. 3B and 3C, control device 120 may determine that a transmitter is tuned to intentionally output a signal at wavelength $\lambda_3$. In this situation, control device 120 may forward tuning instructions to another transmitter 130, associated with the signal at wavelength $\lambda_1$, to change wavelengths to better achieve the desired wavelength difference $\Delta_{DESIRED}$.

If the particular transmitter 130 is not tuned for networking purposes (block 510—NO) control device 120 may determine if a tuning instruction was previously sent to the particular transmitter during a particular time period (block 530). For example, control device 120 may store a record tracking when an instruction was sent to the particular transmitter 130. If an instruction was not previously sent to the particular transmitter during the particular time period (block 530—NO), control device 120 may forward tuning instructions to the particular transmitter 130 to modify a transmission property of the particular transmitter 130 (block 540). For example, control device 120 may identify a desired signal attribute (e.g., a desired wavelength or power level) and may forward instructions to a transmitter 130 to output a signal having the desired attribute. For example, the tuning instructions forwarded in block 540 may cause the particular transmitter 130 to activate or deactivate a component (e.g., activate a filter or lens) or change the operation of component (e.g., cause a light source to output a signal having different optical characteristics).

In one implementation, control device 120 may determine a total number of tuning instructions forwarded to the particular transmitter 130 during a time period. In another implementation, control device 120 may determine a number of tuning instructions, related to a particular undesired transmission property, that were forwarded to the particular transmitter 130 during a time period. For example, if the particular transmitter 130 outputs a signal at an undesired wavelength, control device 120 may disregard prior tuning instructions related to modifying a power level associated with the signal.

If a tuning instruction was previously sent to the particular transmitter (block 530—YES), control device 120 may determine whether the tuning instruction was previously sent to the particular transmitter 130 more than a threshold number (N) of times over a particular period of time (block 550). For example, control device 120 may identify whether the particular transmitter 130 is continuing to output an undesirable signal (e.g., having an attribute that differs from a desired level) after receiving N instructions to modify the signal during the time period, such as during the last hour or day. If a particular transmitter 130 continues to output a signal having undesired properties despite receiving the N prior tuning instructions during the time period, the particular transmitter 130 may be faulty and may not be tunable by control device 120 to operate in a desired manner.

If less than a threshold number of tuning instructions were previously sent to the particular transmitter 130 during a particular period of time (block 550—NO), control device 120 may forward tuning instructions to the particular transmitter to modify an associated output signal in process block 540, as previously described.

If tuning instructions were previously sent to the particular transmitter 130 at least the threshold number of times over a particular period of time (block 550—YES), control device 120 may forward instructions to shut down the particular transmitter 130 (block 560). For example, control device 120 may determine that the particular transmitter 130 is faulty and cannot be controlled to operate a desired manner and, therefore, should be shut down. In addition, control device 120 may signal another transmitter 130 (i.e., a backup transmitter 130) to be used to generate the signal associated with the apparently faulty transmitter 130.

Control device 120 may also notify a network management system (not displayed) that the particular transmitter 130 is associated with a malfunction or other problem. In the example shown in FIG. 3B, control device 120 may cause the network management system to disregard the signal associated with $\lambda_3$ after a threshold number of tuning instructions to a corresponding transmitter 130 are unsuccessful (e.g., the tuning instructions do not cause corresponding transmitter 130 to output a signal at a desired wavelength $\lambda_2$). For example, the network management system (or control device 120) may cause power coupler 140 to stop multiplexing the signal from the particular transmitter 130 with signal received from other transmitters 130.

Continuing with the example shown in FIG. 3B, control device 120 may also cause the network management system may disregard a signal associated with $\lambda_1$ because this signal may be unreliable due to the adverse effect of the signal at undesired wavelength $\lambda_3$.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense. Further, non-dependent blocks may be performed in parallel. For example, while a series of blocks has been described with respect to FIGS. 4 and 5, the order of the blocks may be modified in other implementations. For example, control device 120 may determine that a rogue transmitter 130 cannot be instructed to shut down and cause an associated power source (not displayed) to cease providing power to the rogue transmitter or cause an optical component, such as a filter (not displayed), to prevent a signal outputted from the rogue transmitter 130 to be received by power coupler 140 and/or WSS 150. In another implementation, if the operation of a rogue transmitter 130 cannot be changed (e.g., more than a threshold number of instructions have previously been sent to the rogue transmitter 130 during a particular time period), an instruction may also be sent to another transmitter 130 to modify its operation (e.g., output a signal at a sufficiently different wavelength from the rogue transmitter 130).

It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component," a "module," "logic," or a "system" that performs one or more functions. These may include hardware, such as a processor, an ASIC, or a FPGA, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method comprising:
   determining, by a processor, a first wavelength associated with a first signal generated by a first transmitter and a second wavelength associated with a second signal generated by a second transmitter, wherein the first signal and a second signal are combined by a wavelength selective switch (WSS), and wherein the first wavelength and the second wavelength are determined before the first signal and the second are combined by the WSS;
   determining, by the processor, that a difference between the first wavelength and the second wavelength does not satisfy a desired wavelength difference;
   determining, by the processor, whether the first transmitter was instructed to transmit the first signal at the first wavelength for network purposes;

generating, by the processor, an instruction to cause one of the first transmitter or the second transmitter to modify the difference between the first wavelength and the second wavelength, wherein the instruction causes the first transmitter to modify the first wavelength when the first transmitter was not instructed to transmit the first signal at the first wavelength for network purposes, wherein the instruction causes the second transmitter to modify the second wavelength when the first transmitter was instructed to transmit the first signal at the first wavelength for network purposes, wherein generating the instruction includes determining whether at least one other instruction to modify a transmission property was sent to the one of the first transmitter or the second transmitter during a particular time period, and wherein the instruction causes the one of the first transmitter or the second transmitter to stop transmitting when the at least one other instruction was sent to the one of the first transmitter or the second transmitter during the particular time period; and forwarding, by the processor, the instruction to the one of the first transmitter or the second transmitter.

2. The method of claim 1, wherein an add unit combines the first signal and another signal to form a multiplexed signal, and wherein determining the first wavelength and the second wavelength includes:
determining the first wavelength from the multiplexed signal.

3. The method of claim 1, wherein:
the first transmitter and the second transmitter are included in a plurality of transmitters, and
the first signal and the second signals are included in a plurality of signals generated by the plurality of transmitters, and
wherein the method further comprises:
determining a plurality of wavelengths associated with the plurality of signals,
comparing the plurality of wavelengths, and
identifying the first transmitter and the second transmitter from the plurality of transmitters based on comparing the plurality of wavelengths.

4. The method of claim 1, wherein determining that the difference between the first wavelength and the second wavelength does not satisfy the desired wavelength difference includes:
determining that the difference between the first wavelength and the second wavelength and the desired wavelength difference differ by at least a threshold amount.

5. The method of claim 1, wherein determining whether the first transmitter was instructed to transmit the first signal at the first wavelength for network purposes includes:
determining whether instructions were sent, to the first transmitter, to cause the first transmitter to transmit the first signal at the first wavelength.

6. The method of claim 1, wherein determining whether the at least one other instruction to modify the transmission property was sent to the one of the first transmitter or the second transmitter during the particular time period includes:
determining whether a threshold number of other instructions to modify the transmission property were sent to the one of the first transmitter or the second transmitter during a period of time,
wherein the instruction cause the one of the first transmitter or the second transmitter to stop transmitting when the threshold number of other instructions was sent to the one of the first transmitter or the second transmitter during the period of time.

7. The method of claim 1, wherein the first transmitter and the second transmitter are included in one or more reconfigurable optical add/drop multiplexers (ROADMs).

8. The method of claim 1, wherein determining that the difference between the first wavelength and the second wavelength does not satisfy the desired wavelength difference includes:
determining that at least a portion of at least one of the first signal or the second signal will be lost when the first signal and the second signal are combined.

9. A device comprising:
a memory configured to store information identifying a desired wavelength difference between a first signal generated by a first transmitter and a second signal generated by a second transmitter, wherein the first signal and the second signal are combined to form a combined optical signal; and
a processor configured to:
perform sub-optical monitoring of the combined optical signal to determine a first wavelength associated with the first signal and a second wavelength associated with the second signal,
determine that a difference between the first wavelength and the second wavelength does not satisfy the desired wavelength difference,
determine whether the first transmitter was instructed to transmit the first signal at the first wavelength for network purposes,
generate an instruction based on comparing the difference between the first wavelength and the second wavelength and the desired wavelength difference, wherein the instruction causes one of the first transmitter or the second transmitter to modify the difference between the first wavelength and the second wavelength, and wherein the instruction causes the first transmitter to modify the first wavelength when the first transmitter was not instructed to transmit the first signal at the first wavelength for network purposes, wherein the instruction causes the second transmitter to modify the second wavelength when the first transmitter was instructed to transmit the first signal at the first wavelength for network purposes, wherein the processor, when generating the signal, is further configured to determine whether another instruction to tune the one of the first transmitter or the second transmitter was sent to the one of the first transmitter or the second transmitter during a particular time period, and wherein the instruction causes the one of the first transmitter or the second transmitter to stop transmitting when the other instruction was sent to the one of the first transmitter or the second transmitter during the particular time period, and
forward the instruction to the one of the first transmitter or the second transmitter.

10. The device of claim 9, wherein the device is positioned to receive the first signal from an add unit of a reconfigurable optical add/drop multiplexer (ROADM).

11. The device of claim 9, wherein the processor, when determining that the difference between the first wavelength and the second wavelength does not satisfy the desired wavelength difference is further configured to:
determine that at least a portion of at least one of the first signal or the second signal was lost when the first signal and the second signal were combined.

12. The device of claim 9, wherein the processor, when determining whether the first transmitter was instructed to transmit the first signal at the first wavelength, is further configured to:

determine whether a third instruction were sent, to the first transmitter, to cause the first transmitter to transmit the first signal at the first wavelength.

13. The device of claim 9, wherein the processor, when determining whether the at least one other instruction to tune the one of the first transmitter or the second transmitter was sent to the one of the first transmitter or the second transmitter during the particular time period, is further configured to:

determine whether a threshold number of other instructions to tune the one of the first transmitter or the second transmitter were sent to the one of the first transmitter or the second transmitter during a period of time, wherein the instruction causes the one of the first transmitter or the second transmitter to stop transmitting when the threshold number of other instructions was sent to the one of the first transmitter or the second transmitter during the period of time.

14. The device of claim 9, wherein the first transmitter and the second transmitter are included in one or more reconfigurable optical add/drop multiplexers (ROADMs).

15. The device of claim 9, wherein the first transmitter includes a first tunable laser and the second transmitter includes a second tunable laser.

16. A non-transitory computer-readable medium configured to store instructions, the instructions including:

one or more instructions that, when executed by a processor, cause the processor to:

receive a combined signal from an add unit, wherein a first signal, included in the combined signal, is generated by a first transmitter, and wherein a second signal, included in the combined signal, is generated by a second transmitter;

perform sub-optical monitoring of the combined signal to determine a first wavelength associated with the first signal and a second wavelength associated with the second signal;

determine that a difference between the first wavelength and the second wavelength does not satisfy a desired wavelength difference;

determine whether the first transmitter was instructed to transmit the first signal at the first wavelength for network purposes;

generate an instruction based on the difference between the first wavelength and the second wavelength, wherein the instruction causes the transmitter to modify a transmission property of the transmitter, wherein the one or more instructions, when causing the processor to generate the instruction further cause the processor to determine whether at least one other instruction to modify a transmission property was sent to one of the first transmitter or the second transmitter during a particular time period, and wherein the instruction causes the one of the first transmitter or the second transmitter to stop transmitting when the at least one other instruction was sent to the one of the first transmitter or the second transmitter during the particular time period; and forward the instruction to the transmitter.

17. The non-transitory computer-readable medium of claim 16, wherein the one or more instructions to determine that the difference between the first wavelength and the second wavelength does not satisfy the desired wavelength difference further includes:

one or more instructions that, when executed by the processor, cause the processor to:

determine that at least a portion of at least one of the first signal or the second signal was lost in the combined signal receive from the add unit.

18. The non-transitory computer-readable medium of claim 16, wherein the one or more instructions to determine whether the first transmitter was instructed to transmit the first signal at the first wavelength for network purposes further includes:

one or more instructions that, when executed by the processor, cause the processor to:

determine whether another instruction were sent to cause the first transmitter to transmit the first signal at the first wavelength.

19. The non-transitory computer-readable medium of claim 16, wherein the first transmitter and the second transmitter are included in one or more reconfigurable optical add/drop multiplexers (ROADMs).

20. The non-transitory computer-readable medium of claim 16, wherein the first transmitter includes a first tunable laser and the second transmitter includes a second tunable laser.

* * * * *